US012517415B2

(12) United States Patent
Chun et al.

(10) Patent No.: US 12,517,415 B2
(45) Date of Patent: Jan. 6, 2026

(54) LENS DRIVER

(71) Applicant: SAMSUNG ELECTRO-MECHANICS CO., LTD., Suwon-si (KR)

(72) Inventors: Jibuem Chun, Suwon-si (KR); Hongjoo Lee, Suwon-si (KR); Namki Park, Suwon-si (KR); Youngbok Yoon, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 367 days.

(21) Appl. No.: 18/125,356

(22) Filed: Mar. 23, 2023

(65) Prior Publication Data

US 2023/0367178 A1    Nov. 16, 2023

(30) Foreign Application Priority Data

Aug. 8, 2022 (KR) .......................... 10-2022-0098802

(51) Int. Cl.
    *G03B 5/04* (2021.01)
    *G03B 13/34* (2021.01)
    *H02N 11/00* (2006.01)
    *H04N 23/68* (2023.01)

(52) U.S. Cl.
    CPC ............... *G03B 5/04* (2013.01); *G03B 13/34* (2013.01); *H02N 11/006* (2013.01); *H04N 23/687* (2023.01); *G03B 2205/0015* (2013.01); *G03B 2205/0069* (2013.01)

(58) Field of Classification Search
    None
    See application file for complete search history.

(56) References Cited

U.S. PATENT DOCUMENTS

| | | | |
|---|---|---|---|
| 2017/0139225 A1 | 5/2017 | Lim | |
| 2020/0137274 A1* | 4/2020 | Lee | ........................ G03B 17/17 |
| 2020/0296287 A1 | 9/2020 | Min et al. | |

(Continued)

FOREIGN PATENT DOCUMENTS

| | | |
|---|---|---|
| KR | 10-2018-0135270 A | 12/2018 |
| KR | 10-2019-0063716 A | 6/2019 |

(Continued)

OTHER PUBLICATIONS

Korean Office Action issued on Oct. 7, 2024, in counterpart Korean Patent Application No. 10-2022-0098802 (5 pages in English, 5 pages in Korean).

(Continued)

*Primary Examiner* — Derek S. Chapel
(74) *Attorney, Agent, or Firm* — NSIP Law

(57) ABSTRACT

An apparatus including a camera module actuator that includes a first coil disposed on a first substrate in a first direction, a first sensor, a first magnet facing the first coil in a second direction, and a second magnet facing the first substrate and the first sensor in the second direction, where the first sensor is disposed without overlapping the first coil in the second direction, the first magnet and the second magnet are separated from each other, and a second gap between the first substrate and the second magnet is greater in the second direction than a first gap between the first substrate and the first magnet in the second direction.

24 Claims, 6 Drawing Sheets

(56) References Cited

U.S. PATENT DOCUMENTS

| | | | |
|---|---|---|---|
| 2021/0199918 A1* | 7/2021 | Lee | G02B 27/646 |
| 2022/0263981 A1* | 8/2022 | Park | H04N 23/51 |
| 2023/0209160 A1* | 6/2023 | Chun | H04N 23/54 |
| | | | 348/374 |

FOREIGN PATENT DOCUMENTS

| | | |
|---|---|---|
| KR | 10-2020-0063487 A | 6/2020 |
| KR | 10-2020-0092560 A | 8/2020 |
| KR | 10-2020-0110036 A | 9/2020 |
| KR | 10-2020-0133703 A | 11/2020 |
| KR | 10-2021-0004196 A | 1/2021 |

OTHER PUBLICATIONS

Korean Office Action issued on Jun. 24, 2025 in corresponding Korean Patent Application No. 10-2022-0098802 (2 pages in English and 3 pages in Korean).

* cited by examiner

LENS DRIVER

CROSS-REFERENCE TO RELATED APPLICATION

This application claims the priority benefit under 35 USC § 119(a) of Korean Patent Application No. 10-2022-0057912 filed in the Korean Intellectual Property Office on May 11, 2022, and Korean Patent Application No. 10-2022-0098802 filed in the Korean Intellectual Property Office on Aug. 8, 2022, the entire disclosures of which are incorporated herein by reference for all purposes.

BACKGROUND

1. Field

The present disclosure relates to a lens driver.

2. Description of the Related Art

As information communication techniques and semiconductor techniques rapidly develop, supply and use of electronic devices are steeply increasing. The electronic devices do not merely remain in their own traditional territory, but converge various functions and provide the converged ones.

Recently, cameras are basically adopted to the portable electronic devices such as smartphones, tablet PCs, or laptop computers, and an autofocus (AF) function, an image stabilizer (IS) function, and a zoom function are added to the portable electronic devices.

As the electronic devices on which the camera module is mounted have become slim, the camera module may also become thin. components of such camera modules may also be desirably slim.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, an apparatus includes a camera module actuator that includes a first coil disposed on a first substrate in a first direction, a first sensor, a first magnet facing the first coil in a second direction, and a second magnet facing the first substrate and the first sensor in the second direction, where the first sensor is disposed without overlapping the first coil in the second direction, the first magnet and the second magnet are separated from each other, and a second gap between the first substrate and the second magnet is greater in the second direction than a first gap between the first substrate and the first magnet in the second direction.

The camera module actuator may further include a yoke disposed on respective surfaces of the first and second magnets that are facing away from the first substrate, or a first yoke is disposed on the surface of the first magnet that faces away from the first substrate and a second yoke is disposed on the surface of the second magnet that faces away from the first substrate.

The first coil may be a fine pattern (FP) coil, the camera module actuator may further include a second coil disposed on a second substrate in the second direction, and the first and second substrates may be separate substrates or different portions of a same substrate.

The camera module actuator may further include a second sensor disposed without overlapping the second coil on the second substrate in the first direction, a third magnet facing the second coil in the first direction, and a fourth magnet facing the second sensor in the first direction, where the third magnet and the fourth magnet may be separated from each other, and a second gap between the second substrate and the fourth magnet may be greater than a first gap between the second substrate and the third magnet in the first direction.

The apparatus may further include a lens barrel, a lens focus driver configured to move the lens barrel in an optical-axis direction perpendicular to the first and second directions, a housing, an image sensor, and a controller configured to perform stabilization, using the first sensor, of the lens barrel in the first and second directions through respective driving of the first and second coils.

The first sensor may be disposed between the first substrate and the second magnet.

A thickness of the first magnet may be equal in the second direction to a thickness of the second magnet in the second direction.

The camera module actuator may further include a yoke disposed on respective surfaces of the first and second magnets that face away from the first substrate, and the yoke may protrude further away from the first substrate where the yoke overlaps the second magnet in the second direction compared to where the yoke overlaps the first magnet in the second direction.

The camera module actuator may further include a second coil disposed on a second substrate in the second direction, a second sensor, a third magnet facing the second coil in the first direction, and a fourth magnet facing the second substrate and the second sensor in the first direction, where the second sensor may be disposed without overlapping the second coil in the first direction, the third magnet and the fourth magnet may be separated from each other, and a fourth gap between the second substrate and the fourth magnet may be greater than a third gap between the second substrate and the third magnet in the first direction.

The second sensor may be disposed between the second substrate and the fourth magnet.

A thickness of the third magnet may be equal in the first direction to a thickness of the fourth magnet in the first direction.

The camera module actuator may further include another yoke disposed on respective surfaces of the third and fourth magnets that face away from the second substrate, and the other yoke may protrude further away from the second substrate where the other yoke overlaps the fourth magnet in the first direction compared to where the other yoke overlaps the third magnet in the first direction.

A thickness of the first magnet in the second direction may be unequal to a thickness of the second magnet in the second direction.

The first magnet may be thicker in the second direction than the second magnet in the second direction.

The camera module actuator may further include a yoke disposed on respective surfaces of the first and second magnets that face away from the first substrate, and a surface of the yoke facing away from the first substrate may be planar in the first direction.

The camera module actuator may further include a second coil disposed on a second substrate in the second direction, a second sensor, a third magnet facing the second coil in the first direction, and a fourth magnet facing the second substrate and the second sensor in the first direction, where the second sensor may be disposed without overlapping the second coil in the first direction, the third magnet and the fourth magnet may be separated from each other, and a fourth gap between the second substrate and the fourth magnet may be greater than a third gap between the second substrate and the third magnet in the first direction.

The second sensor may be disposed between the second substrate and the fourth magnet.

A thickness of the third magnet in the first direction may be unequal to a thickness of the fourth magnet in the first direction.

The third magnet may be thicker in the first direction than the fourth magnet in the first direction.

The camera module actuator may further include another yoke disposed on respective surfaces of the third magnet and the fourth magnet that face away from the second substrate, where a surface of the other yoke facing away from the second substrate may be planar in the second direction.

In one general aspect, an apparatus includes a camera module actuator that includes a fine pattern (FP) coil disposed on a substrate in a first direction perpendicular to an optical axis of a lens barrel, another coil disposed on the substrate in a second direction perpendicular to the first direction and the optical axis, a Hall sensor, a driving magnet facing the FP coil in the second direction, and a sensing magnet, separated from the driving magnet in the first direction, facing the hall sensor and a first portion of the substrate in the second direction, the first portion of the substrate being a portion of the substrate where the FP coil is not disposed, where the sensing magnet partially overlaps the FP coil in the second direction.

A second gap between the first substrate and the sensing magnet may be greater in the second direction than a first gap between the first substrate and the driving magnet in the second direction.

The driving magnet may be thicker in the second direction than the sensing magnet in the second direction.

The apparatus may further include a controller configured to perform selective stabilization, using the hall sensor, of the lens barrel in the first and second directions respectively through a driving of the FP coil and the driving magnet and a driving of the other coil and a corresponding driving magnet.

Other features and aspects will be apparent from the following detailed description, the drawings, and the claims.

Figure 1:
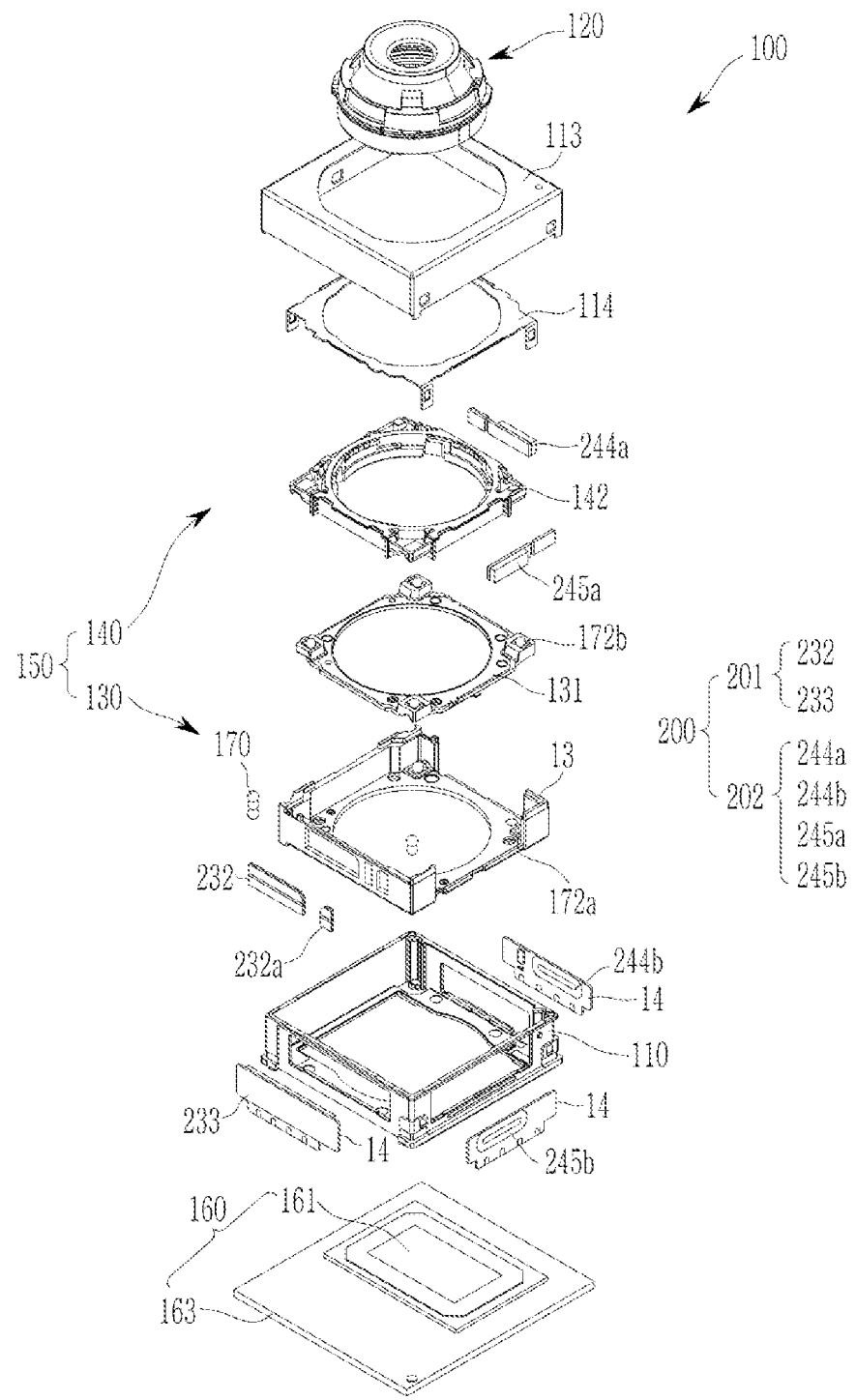
FIG. 1 shows an exploded perspective view of a camera module according to one or more embodiments.

Throughout the drawings and the detailed description, unless otherwise described or provided, the same drawing reference numerals may be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness, noting that omissions of features and their descriptions are also not intended to be admissions of their general knowledge.

While descriptions of components of examples may be provided, such descriptions are not intended to mean that such corresponding embodiments are limited to such components.

For example, features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. An element, component, or part may be connected to another element, component, or part physically or electrically. Respective elements that are substantially integrated into one body may be connected to each other. The word "on" or "above" means positioned on or below the object portion, and does not necessarily mean positioned on the upper side of the object portion based on a gravitational direction.

A size and/or thickness of each example shown in the drawings are arbitrarily shown for better understanding and ease of description, but the embodiments are not limited thereto. In the drawings, the thicknesses of layers, films, panels, regions, etc., may be respectively enlarged and/or exaggerated as compared to other layers, films, panels, regions, etc., for clarity purposes. The phrase "in a plan view" means viewing an object portion from the top, and the phrase "in a cross-sectional view" means viewing a cross-section of which the object portion is vertically cut from the side.

The terminology used herein is for the purpose of describing examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof.

The use of the term "may" herein with respect to an example or embodiment (e.g., as to what an example or embodiment may include or implement) means that at least one example or embodiment exists where such a feature is included or implemented, while all examples are not limited thereto.

Unless otherwise defined, all terms, including technical and scientific terms, used herein have the same meaning as commonly understood by one of ordinary skill in the art to which this disclosure pertains and after an understanding of the disclosure of this application. Terms, such as those defined in commonly used dictionaries, are to be interpreted as having a meaning that is consistent with their meaning in the context of the relevant art and the disclosure of this application, and are not to be interpreted in an idealized or overly formal sense unless expressly so defined herein.

Also, in the description of example embodiments, detailed description of structures or functions that are thereby known after an understanding of the disclosure of the present application will be omitted when it is deemed that such description will cause ambiguous interpretation of the example embodiments.

FIG. 1 shows an exploded perspective view of a camera module according to one or more embodiments.

Referring to FIG. 1, a camera module 100 may include a lens barrel 120, a lens driving device 150 configured to move the lens barrel 120, an image sensor unit 160 configured to convert light, received/captured by the image sensor unit through the lens barrel 120, into electrical signals, and a housing 110 and a cover 113 configured to receive the lens barrel 120 and the lens driving device 150.

The lens driving device 150 is a device configured to move the lens barrel 120, and may include a focus control unit 130 configured to adjust a focus and a stabilization unit 140 configured to correct for vibration.

The lens barrel 120 may be disposed in, or received into, a lens holder 142, and may be disposed in, or received into, the focus control unit 130 together with the guide member 131.

The focus control unit 130 may include a carrier 13 configured to dispose, or receive, the lens barrel 120 and a focus control driver configured to generate a driving force to move the lens barrel 120 and the carrier 13 in an optical-axis direction.

The focus control driver may include a first lens driver 201 including a magnet 232 and a coil 233. The magnet 232 of the first lens driver 201 may be mounted on one side of the carrier 13, and the coil 233 may be formed in or on the substrate 14 and may be mounted on the housing 110.

When a power voltage is applied to the coil 233, from the first lens driver 201, the carrier 13 may be moved in the optical-axis direction by an electromagnetic influence between the magnet 232 and the coil 233. As the lens barrel 120 is disposed in the carrier 13, the lens barrel 120 is moved in the optical-axis direction by a movement of the carrier 13.

A first rolling member 170 may be disposed between the carrier 13 and the housing 110, to reduce friction between the carrier 13 and the housing 110, when the carrier 13 is moved in the optical-axis direction. The first rolling member 170 may have a ball shape, and may be disposed on respective sides of the magnet 232. A guide groove may be formed in the carrier 13 so that the first rolling member 170 may be disposed therein and may be guided by the guide groove in the optical-axis direction.

The stabilization unit 140 may include a guide member 131 configured to guide the movement of the lens barrel 120, e.g., in one or more directions perpendicular to the optical-axis direction, and a stabilization driver configured to generate respective driving forces to move the guide member 131 in such one or more directions.

The guide member 131 and the lens holder 142 may be disposed in, e.g., insertively disposed into, the carrier 13, in the optical-axis direction, and may be configured to guide movements of the lens barrel 120, e.g., in such one or more directions perpendicular to the optical-axis direction.

In a non-limiting example, the lens holder 142 may have a quadrangular cast shape. Magnets 244a and 245a may be disposed in/at the lens holder 142 for correcting vibration or hand trembling or shaking, for example, and may be respectively positioned on two adjacent sides of the lens holder 142. A stopper 114 configured to prevent the lens holder 142 from leaving, or extending beyond, an inner space of the carrier 13 may be further disposed on an upper portion of the lens barrel 120. In an example, the stopper 144 may be a portion the carrier 13.

The stabilization driver may include a second lens driver 202, and the second lens driver 202 may include magnets 244a and 245a and coils 244b and 245b. The second lens driver 202, for example, may also be referred to herein as a camera module actuator. The magnets 244a and 245a of the second lens driver 202 may be mounted on/at the lens holder 242, and the coils 244b and 245b may be formed in or on the substrate 14, facing the magnets 244a and 245a, and may be fixedly mounted on/at the housing 110.

A plurality of second ball members 172a and a plurality of third ball members 172b may be respectively provided to maintain alignment of the stabilization unit 140 with respect to the optical-axis direction, for example, and respectively provided to guide the lens holder 142 during a vibration or shaking correcting process, e.g., in the directions perpendicular to the optical-axis direction. The second ball members 172a and the third ball members 172b may maintain a gap between the carrier 13 and the lens holder 142 during the vibration or shaking correcting process.

The image sensor unit 160 is configured to convert light received through the lens barrel 120 into electrical signals. For example, the image sensor unit 160 may include an image sensor 161 and a printed circuit board (PCB) 163 connected to the image sensor 161, and may further include an infrared ray filter. The infrared ray filter blocks light of an infrared ray region from among the wavelengths of the light received through the lens barrel 120.

The image sensor 161 may be a charge coupled device (CCD) or a complementary metal-oxide semiconductor (CMOS), for example. The electrical signals converted by the image sensor 161 may be output as images through a display of a portable electronic device embodiment herein, e.g., which includes the camera module 100. Such portable electronic devices may include smartphones, tablet PCs, or laptop computers, as non-limiting examples. The image sensor 161 may be fixed to the printed circuit board PCB 163, and may be electrically connected to the printed circuit board 163.

The lens barrel 120 and the lens driving device are disposed/received in the inner space of the housing 110, and for example, the housing 110 may have a box shape of which an upper portion and a lower portion are open. The image sensor unit 160 may be disposed on the lower portion of the housing 110.

The cover 113 is configured to combine with the housing 110 to surround an external side of the housing 110, and to protect internal elements of the camera module. The cover 113 may shield electromagnetic waves. For example, the cover 113 may shield electromagnetic waves so that the electromagnetic waves generated by the camera module may not influence other electronic parts in the portable electronic device.

Further, as various electronic parts in addition to the camera module are mounted on/in the portable electronic device, such as a corresponding processor and display, the cover 113 may shield electromagnetic waves generated by such other electronic parts of the portable electronic device so as to not influence or affect operations of the camera module. The cover 113 may be made of a metallic material and may be grounded to a ground pad mounted on the printed circuit board PCB 163, for example, thereby shielding electromagnetic waves from exiting or entering the cover 113.

The coil 233 of the focus control driver and the coils 244*b* and 245*b* of the stabilization driver may be buried in the substrate 14, and may be formed to be parts of the substrate 14, e.g., formed on the substrate 14. Respectively, the coil 233 of the focus control driver and the coils 244*b* and 245*b* of the stabilization driver may be buried in, or part of, the substrate 14.

The focus control driver and the stabilization driver may respectively include a sensor for sensing movement of the lens barrel 120. The sensors of the focus control driver and the stabilization driver may respectively have an IC package form that is controlled by a controller, e.g., included in the printed circuit board PCB 163 connected to the image sensor 161. In an example, the controller may include one or more processors, or other circuitry. In an example, the respective sensor of the focus control driver and the stabilization driver may include Hall sensors. Herein, the respective sensors of the focus control driver and the stabilization driver may be referred to as sensing portions.

Figure 2:
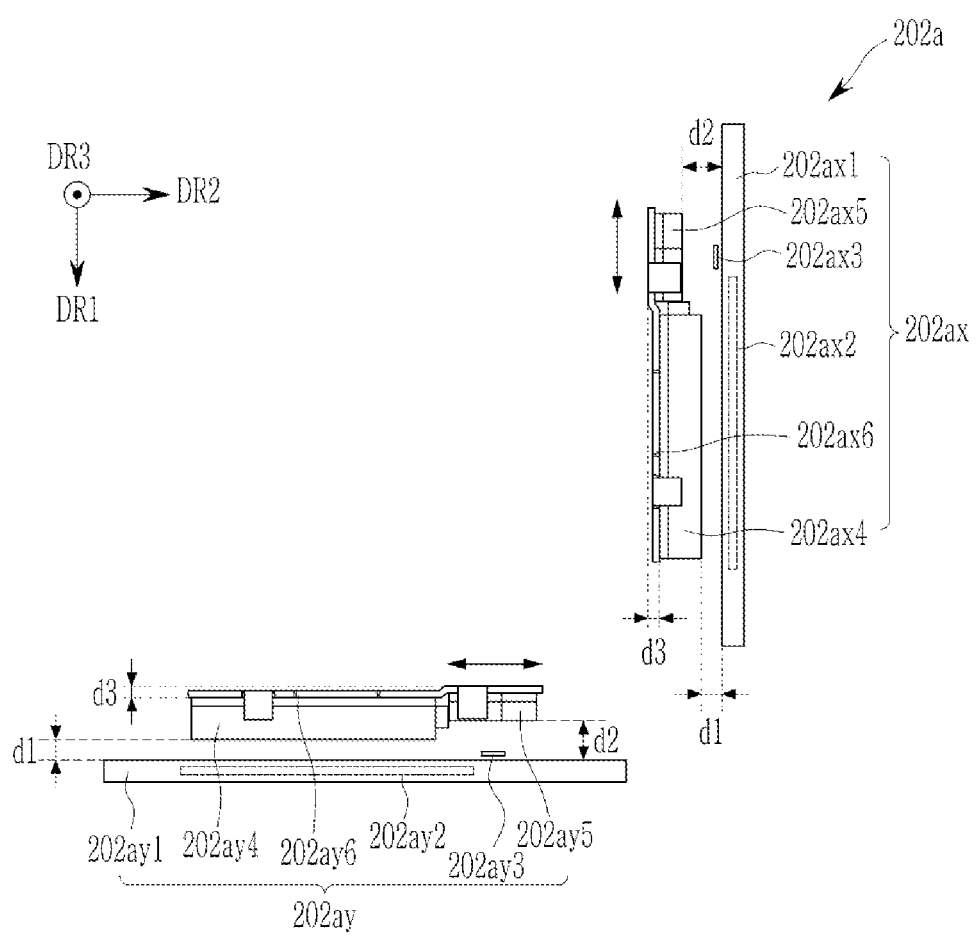
FIG. 2 shows a top plan view of a lens driver according to one or more embodiments.
Figure 3:
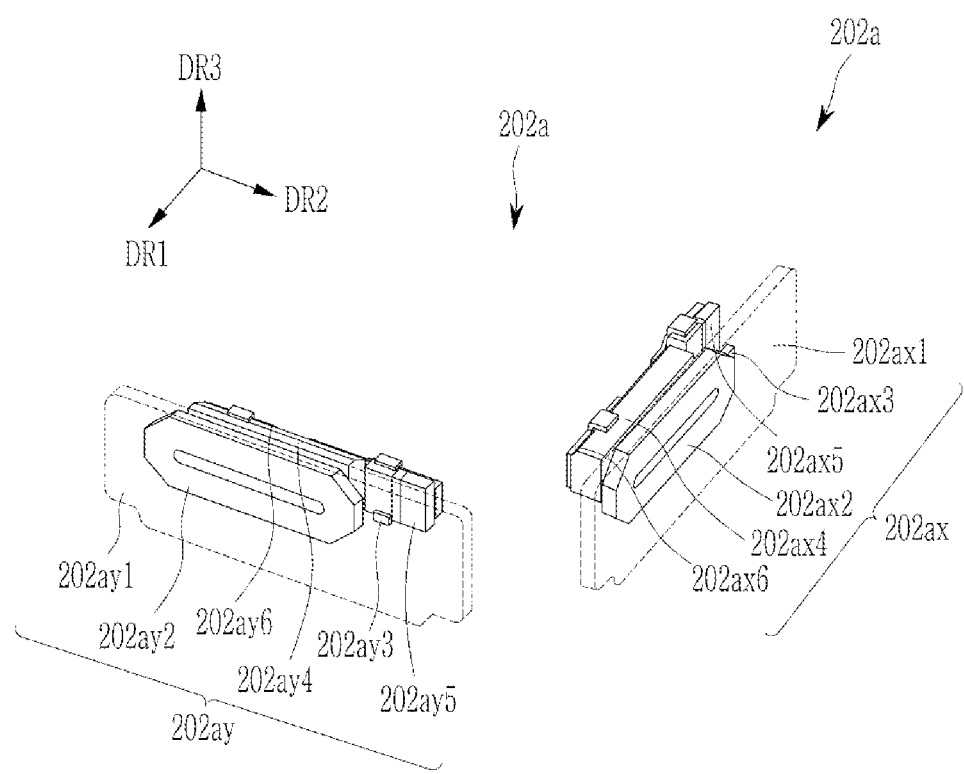
FIG. 3 shows a perspective view of a lens driver according to one or more embodiments.

FIG. 2 shows a top plan view of a lens driver according to one or more embodiments, and FIG. 3 shows a perspective view of a lens driver according to one or more embodiments.

Referring to FIG. 2 and FIG. 3, the lens driver 202*a* may include a first lens driver 202*ax* disposed in parallel to a first direction DR1 and a second lens driver 202*ay* disposed in parallel to a second direction DR2 that is different from the first direction DR1. The lens driver 202*a* may correspond to the stabilization driver described above with respect to FIG. 1, as a non-limiting example.

The first lens driver 202*ax* may include a substrate 202*ax*1, a coil 202*ax*2, a sensing portion 202*ax*3, a first magnet 202*ax*4, a second magnet 202*ax*5, and a yoke 202*ax*6.

The coil 202*ax*2 of the first lens driver 202*ax* may be formed in or on the substrate 202*ax*1, and for example, the coil 202*ax*2 may be a winding coil buried in the substrate 202*ax*1. Alternatively, the coil 202*ax*2 may be a fine pattern (FP) coil, e.g., formed on the substrate 202*ax*1. Typical position sensing approaches of a camera module actuator structure with a typical winding coil, buried in a substrate, may not have much limitation in the placement of a sensing portion, e.g., a typical Hall sensor, because the thickness of the substrate in such approaches may be sufficiently thin. Rather, in one or more embodiments with one or more respective FP coil position sensing approaches, for example, where the FP coil is fine patterned in or on a substrate, described herein, configurations and positionings of corresponding sensing portions may be different compared to the typical position sensing approaches of the camera actuator structure with the winding coil.

The sensing portion 202*ax*3 may include a sensor such as a Hall sensor, and may be positioned outside the substrate 202*ax*1. The sensing portion 202*ax*3 may not overlap the coil 202*ax*2 in the first direction DR1 and a third direction DR3 in which the substrate 202*ax*1 extends, and may not overlap the coil 202*ax*2 in a second direction DR2 that is perpendicular to the first direction DR1 and the third direction DR3. The substrate 202*ax*1 may also face the first magnet 202*ax*4 and the second magnet 202*ax*5 in the second direction DR2.

The first magnet 202*ax*4 is separated and spaced from the second magnet 202*ax*5. The first magnet 202*ax*4 may face the coil 202*ax*2 in the second direction DR2, and the second magnet 202*ax*5 may face the sensing portion 202*ax*3 in the second direction DR2 and may face at least a portion of the coil 202*ax*2 in the second direction DR2. Herein, such first magnets (or third magnets discussed further below) may also be referred to as driving magnets, and such second magnets (or fourth magnets discussed further below) may also be referred to as sensing magnets.

A second gap d2 between the substrate 202*ax*1 and the second magnet 202*ax*5 may be greater than a first gap d1 between the substrate 202*ax*1 and the first magnet 202*ax*4 in the second direction DR2.

A surface of the second magnet 202*ax*5 facing the substrate 202*ax*1 may be disposed further from the surface of the substrate 202*ax*1 in the second direction DR2, than a surface of the first magnet 202*ax*4 facing the substrate 202*ax*1 in the second direction DR2, and another surface of the second magnet 202*ax*5 facing away from the substrate 202*ax*1 may further protrude, by a third gap d3, in the second direction DR2 compared to a surface of the first magnet 202*ax*4 facing away from the substrate 202*ax*1 in the second direction DR2. For example, the surface of the first magnet 202*ax*4 facing the substrate 202*ax*1 in the second direction DR2 and the surface of the second magnet 202*ax*5 facing the substrate 202*ax*1 in the second direction DR2 are not disposed in series in the first direction DR1, i.e., at a same distance in the second direction DR2 from the substrate 202*ax*1, but are disposed with the illustrated step in the first direction DR1. For example, this corresponding magnets structure of the second lens driver 202*ax* may have a step, in the first direction DR1, where the distance between the surface of the first magnet 202*ax*4 facing the substrate 202*ax*1 in the second direction DR2 in this magnets structure becomes less than the distance between the surface of the second magnet 202ax5 facing the substrate 202ax1 in the second direction DR2 in this magnets structure.

The yoke 202ax6 may be positioned on rear sides of the first magnet 202ax4 and the second magnet 202ax5, and may fix the first magnet 202ax4 and the second magnet 202ax5, with respect to each other, and thus, form the magnets structure of the first lens driver 202ax.

The yoke 202ax6 may not be entirely flat or planar in the first direction DR1. For example, a portion of the yoke 202ax6 that corresponds to the second magnet 202ax5 in the second direction DR2 may protrude, in a direction that is parallel to the second direction DR2, compared to a portion of the yoke 202ax6 that corresponds to the first magnet 202ax4 in the second direction DR2. For example, this portion of the yoke 202ax6 that corresponds to the first magnet 202ax4 in the second direction DR2 may support or fix a portion of the first magnet 202ax4 closest to the second magnet 202ax5 in the first direction DR1. The distance of this protrusion, in the direction that is parallel to the second direction DR2, may correspond to a third gap d3 in the second direction DR2. For example, a surface of a portion of the yoke 202ax6 that faces away from the first magnet 202ax4 in the second direction DR2 and a surface of a portion of the yoke 202ax6 that faces away from the second magnet 202ax5 in the second direction DR2 may have a gap difference of the third gap d3 in the second direction DR2.

With the second magnet 202ax5 being disposed further from the substrate 202ax1 than the first magnet 202ax4, a space is provided for the sensing portion 202ax3 between the substrate 202ax1 and the second magnet 202ax5, and the relatively small first gap d1 may be maintained between the first magnet 202ax4 and the coil 202ax2 so the driving force according to an electromagnetic force between the first magnet 202ax4 and the coil 202ax2 may not be reduced.

For example, considering an arrangement according to one or more embodiments of the sensing portion 202ax3 being disposed between the substrate 202ax1 and the second magnet 202ax5 in the second direction DR2, if a gap between a substrate and a first magnet were to be equal in the second direction DR2 to a gap between the substrate and a second magnet, to accommodate such a disposition of the sensing portion this equal gap would have to be increased compared to a typical same or equal gap, e.g., d1, in the second direction DR2 without the disposition of the sensing portion between the substrate and the second magnet. Hereinafter, such an example with the equal gaps between the substrate and the first and second magnet being sufficient to accommodate a sensing portion disposed between the second magnet and the substrate, will be referred to as "the example equal gaps arrangement." However, with the example equal gaps arrangement, when the same driving voltage is applied as with the typical equal gap arrangement without such a disposed sensing portion, the electromagnetic force between the first magnet and the coil positioned in the substrate would be reduced compared to the typical equal gap arrangement. Thus, with the example equal gaps arrangement, a size, value, or amplitude of the driving voltage applied to the corresponding lens driver would have to be greater than with the typical gap arrangement for a same movement.

However, as described above, according to one or more embodiments, the coil 202ax2 may be formed in or on the substrate 202ax1, and the second magnet 202ax5 facing the sensing portion 202ax3 may be disposed farther from the substrate 202ax1 than the first magnet 202ax4 facing the coil 202ax2 so the sensing portion 202ax3 may be disposed between the substrate 202ax1 and the second magnet 202ax5. With such an arrangement according to one or more embodiments, the lens driving force may be maintained, with less increasing or without having to increase the driving voltage applied to the lens driver such as in the example equal gaps arrangement, by lessening or preventing the reduction of the electromagnetic force between the first magnet 202ax4 and the substrate 202ax1 compared to the example equal gaps arrangement. The lens driver 202ax may be realized as a thin type by forming the coil 202ax2 of the lens driver in or on the substrate 202ax1.

In a similar configuration as the first lens driver 202ax, where gaps d1, d2, and d3 are in the second direction DR2, and coil 202ax2, sensing portion 202ax3, first magnet 202ax4, second magnet 202ax5, and yoke 202ax6 are respectively disposed with respect to the substrate 202ax1 in the second direction DR2, and respectively disposed with respect to each other in the first direction DR1, the second lens driver 202ay may include a coil 202ay2, a sensing portion 202ay3, a first magnet 202ay4, a second magnet 202ay5, and a yoke 202ay6 respectively disposed with respect to a substrate 202ay1 in the first direction DR1, and respectively disposed with respect to each other in the second direction DR2, along with corresponding gaps d1, d2, and d3 in the first direction DR1.

The coil 202ay2 of the second lens driver 202ay may be a winding coil buried in the substrate 202ay1. In an alternate example, the second lens driver 202ay may be a fine pattern (FP) coil.

The first magnet 202ay4 and the second magnet 202ay5 of the second lens driver 202ay are separated and spaced from each other in the second direction DR2, the first magnet 202ay4 may face the coil 202ay2 in the first direction DR1, the second magnet 202ay5 may face the sensing portion 202ay3 and may face at least a portion of the coil 202ay2 in the first direction DR1.

The second gap d2 between the second magnet 202ay5 and the substrate 202ay1 may be greater than the first gap d1 between the first magnet 202ay4 and the substrate 202ay1 in the first direction DR1. For example, a surface of the second magnet 202ax5 facing the substrate 202ay1 may be disposed further from a surface of the substrate 202ay1 in the first direction DR1 than a surface of the first magnet 202ay4 facing the substrate 202ay1, and another surface of the second magnet 202ay5 facing away from the substrate 202ay1 may protrude further, by the third gap d3, in the first direction DR1 away from the substrate 202ay1 compared to a surface of the first magnet 202ay4 facing away from the substrate 202ay1. For example, the surface of the first magnet 202ay4 facing the substrate 202ay1 in the first direction DR1 and the surface of the second magnet 202ay5 facing the substrate 202ay1 in the first direction DR1 are not disposed in series in the second direction DR2, i.e., at a same distance in the first direction DR1 from the substrate 202ay1, but are disposed with the illustrated step in the second direction DR2. For example, this corresponding magnets structure of the second lens driver 202ay may have a step, in the second direction DR2, where the distance between the surface of the first magnet 202ay4 facing the substrate 202ay1 in the first direction DR1 in this magnets structure becomes less than the distance between the surface of the second magnet 202ay5 facing the substrate 202ay1 in the first direction DR1 in this magnets structure.

The yoke 202ay6 may not be entirely flat or planar in the second direction DR2. For example, a portion of the yoke 202ay6 that corresponds to the second magnet 202ay5 in the first direction DR1 may protrude by a third gap d3 in the direction that is parallel to the first direction DR1, compared to a portion of the yoke 202*ay*6 that corresponds to the first magnet 202*ay*4 in the first direction DR1. For example, this portion of the yoke 202*ay*6 that corresponds to the first magnet 202*ay*4 in the first direction DR1 may support or fix a portion of the first magnet 202*ay*4 closest to the second magnet 202*ay*5 in the second direction DR2.

The sensing portion 202*ay*3 may be a Hall sensor. The sensing portion 202*ay*3 may be positioned between the substrate 202*ay*1 and the second magnet 202*ay*5 in the first direction DR1. As a surface of the second magnet 202*ay*5 facing away from the substrate 2*ay*1 is disposed farther away, e.g., by the third gap d3, from the substrate 202*ay*1 than a surface of the first magnet 202*ay*4 facing away from the substrate 202*ay*1, a space is provided for the sensing portion 202*ay*3 between the substrate 202*ay*1 and the second magnet 202*ay*5, and a gap between the first magnet 202*ay*4 and the coil 202*ay*2 may be maintained to be the relatively small first gap d1 so the driving force caused by the electromagnetic force between the first magnet 202*ay*4 and the coil 202*ay*2 may be lessened or not reduced compared to the example equal gaps arrangement, as applied to this example with the substrate 202*ay*1, for a same movement, and a need for increasing of the driving voltage may be lessened or prevented compared to the example equal gaps arrangement. The second lens driver 202*ay* may be realized as a thin type by forming the coil 202*ay*2 of the lens driver in or on the substrate 202*ay*1.

Based on the sensing portion 202*ax*3, the second magnet 202*ax*5, and the coil 202*ax*2 of the first lens driver 202*ax* being disposed in parallel to the first direction DR1 of the lens driver 202*a*, a position change of the lens barrel according to a direction that is parallel to the first direction DR1 may be sensed, and the coil 202*ax*2 and the first magnet 202*ax*4 of the first lens driver 202*ax* may be activated, e.g., by adjusting a driving voltage applied to the coil 202*ax*2, to move the lens barrel in a direction that is parallel to the first direction DR1. In a similar way to this, based on the sensing portion 202*ay*3, the second magnet 202*ay*5, and the coil 202*ay*2 of the second lens driver 202*ay* being disposed in parallel to the second direction DR2 of the lens driver 202*a*, a position change of the lens barrel in a direction that is parallel to the second direction DR2 may be sensed, and the coil 202*ay*2 and the first magnet 202*ay*4 of the second lens driver 202*ay* may be activated, e.g., by adjusting a driving voltage applied to the coil 202*ay*2, to move the lens barrel in a direction that is parallel to the second direction DR2.

The substrate 202*ax*1 of the first lens driver 202*ax* and the substrate 202*ay*1 of the second lens driver 202*ay* may be connected to each other to configure one substrate.

As described with reference to FIG. 1, the focus control driver 201 may generate a driving force to move the lens barrel 120 in the optical-axis direction, for example, the third direction DR3, and the stabilization driver 202 may generate respective driving forces to move the lens barrel 120 in the first direction DR1 and the second direction DR2 that are perpendicular to the third direction DR3.

The first lens driver 202*ax* and the second lens driver 202*ay* of the lens driver 202*a* may be the stabilization driver 202 of FIG. 1. In an example, when a shaking error is detected or generated by an apparatus that includes the camera module, and provided to the camera module, the first lens driver 202*ax* and the second lens driver 202*ay* may respectively control and provide movement of the lens barrel 120 in the first direction DR1 and the second direction DR2, thereby correcting the movement caused by the shaking.

Figure 4:
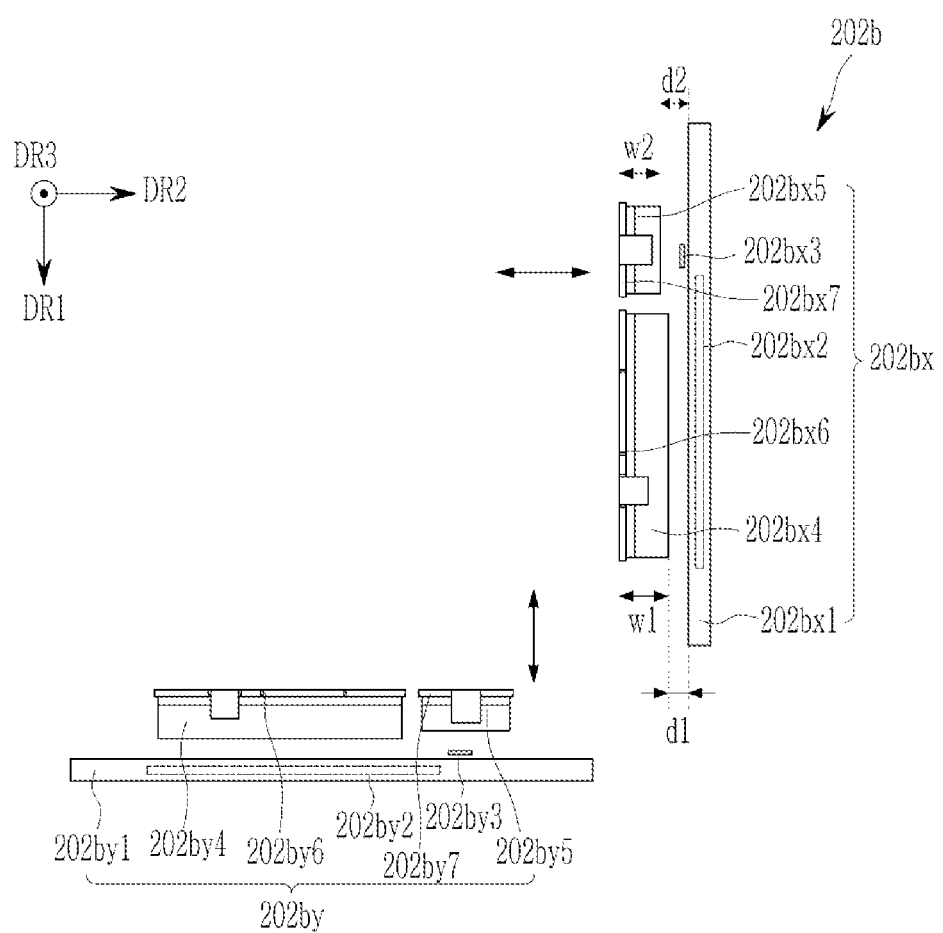
FIG. 4 shows a top plan view of a lens driver according to one or more embodiments.
Figure 5:
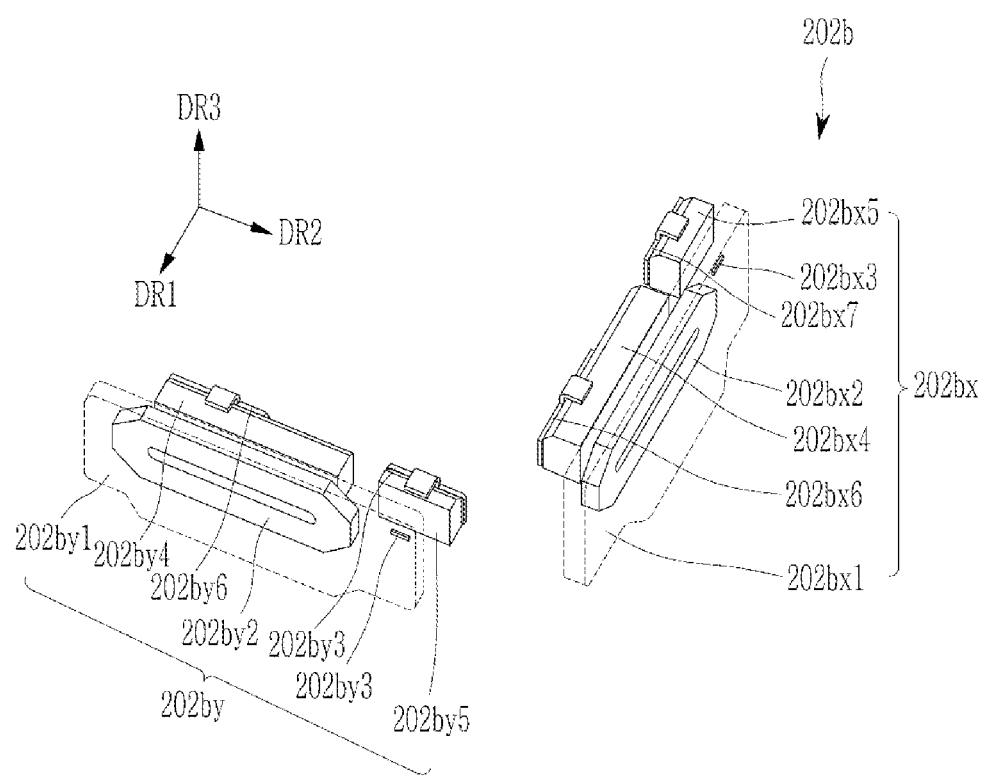
FIG. 5 shows a perspective view of a lens driver according to one or more embodiments.

FIG. 4 shows a top plan view of a lens driver according to one or more embodiments, and FIG. 5 shows a perspective view of a lens driver according to one or more embodiments.

Referring to FIG. 4 and FIG. 5, the lens driver 202*b* may include a first lens driver 202*bx* disposed in parallel to the first direction DR1, and a second lens driver 202*by* disposed in parallel to the second direction DR2 that is different from the first direction DR1.

The first lens driver 202*bx* and the second lens driver 202*by* of the lens driver 202*b* may be the stabilization driver 202 of FIG. 1, as a non-limiting example, and when a vibration or shaking error is detected and signaled to the camera module, the first lens driver 202*bx* and the second lens driver 202*by* may be activated, e.g., by respective driving voltages applied to a coil 202*bx*2 and a coil 202*by*2 of the first lens driver 202*bx*, and move the lens barrel 120 in the first direction DR1 and/or the second direction DR2 that are perpendicular to the third direction DR3, thereby correcting the movement caused by such shaking, for example.

The first lens driver 202*bx* may include a substrate 202*bx*1, a coil 202*bx*2, a sensing portion 202*bx*3, a first magnet 202*bx*4, a second magnet 202*bx*5, a first yoke 202*bx*6, and a second yoke 202*bx*7.

The coil 202*bx*2 of the first lens driver 202*bx* may be a winding coil buried in the substrate 202*bx*1. Alternatively, the coil 202*bx*2 may be a fine pattern (FP) coil.

The sensing portion 202*bx*3 may include a sensor such as a Hall sensor, and may be positioned outside the substrate 202*bx*1. The sensing portion 202*bx*3 may not overlap the coil 202*bx*2 in the first direction DR1 and the third direction DR3 in which the substrate 202*bx*1 extends, and may not overlap the coil 202*bx*2 in a second direction DR2 that is perpendicular to the first direction DR1 and the third direction DR3. The substrate 202*bx*1 may also face the first magnet 202*bx*4 and the second magnet 202*bx*5 in the second direction DR2.

The first magnet 202*bx*4 is separated and spaced from the second magnet 202*bx*5 in the first direction DR1. The first magnet 202*bx*4 may face the coil 202*bx*2 in the second direction DR2, and the second magnet 202*bx*5 may face the sensing portion 202*bx*3 in the second direction DR2. The second magnet 202*bx*5 may face at least a portion of the coil 202*bx*2.

A second gap d2 between the substrate 202*bx*1 and the second magnet 202*bx*5 in the second direction DR2 may be greater than a first gap d1 between the substrate 202*bx*1 and the first magnet 202*bx*4 in the second direction DR2.

A first thickness w1 of the first magnet 202*bx*4 in the second direction DR2 may be greater than a second thickness w2 of the second magnet 202*bx*5 in the second direction DR2.

In an example, a surface of the first magnet 202*bx*4 and a surface of the second magnet 202*bx*5 that respectively face away from the substrate 202*bx*1 may be disposed in series, e.g., herein, same series or substantially in series, in the first direction DR1, i.e., at a same distance in the second direction DR2 from the substrate 202*bx*1.

The first yoke 202*bx*6 may be disposed or positioned on the surface of the first magnet 202*bx*4 facing away from the substrate 202*bx*1, and the second yoke 202*bx*7 may be disposed or positioned on the surface of the second magnet 202*ax*5 facing away from the substrate 202*bx*1. The first yoke 202*bx*6 and the second yoke 202*bx*7 may respectively support or fix the first magnet 202*ax*4 and the second magnet 202*ax*5. Thus, in an example, the first yoke 202*bx*6 is separated from the second yoke 202*bx*7 in the first direction DR1. In an example, the first yoke 202*bx*6 may be connected to the second yoke 202*bx*7 in the first direction DR1.

The sensing portion 202*bx*3 may be positioned between the substrate 202*bx*1 and the second magnet 202*bx*5 in the second direction DR2. The second magnet 202*bx*5 is disposed farther from the substrate 202*bx*1 in the second direction DR2 than the first magnet 202*bx*4 so a space is provided for the sensing portion 202*bx*3 between the substrate 202*bx*1 and the second magnet 202*bx*5. The gap between the first magnet 202*bx*4 and the coil 202*bx*2 may be maintained to be the relatively small first gap d1 so the driving force caused by the electromagnetic force between the first magnet 202*bx*4 and the coil 202*bx*2 may not be reduced for a same movement, e.g., compared to another example equal gaps arrangement with separated first and second magnets having equal gaps between a corresponding substrate and the first and second magnets, with a sensing portion disposed between the second magnet and the substrate, hereinafter referred to as "the other example equal gaps arrangement."

Thus, the coil 202*bx*2 may be formed in or on the substrate 202*bx*1, the second magnet 202*bx*5 facing the sensing portion 202*bx*3 may be formed to be thinner than the first magnet 202*bx*4 facing the coil 202*bx*2, and the second magnet 202*bx*5 is disposed farther from the substrate 202*bx*1 than the first magnet 202*bx*4 so the sensing portion 202*bx*3 may be disposed between the substrate 202*bx*1 and the second magnet 202*bx*5. With such an arrangement according to one or more embodiments, a reduction of the electromagnetic force between the first magnet 202*bx*4 and the substrate 202*bx*1 may be lessened or prevented to maintain a lens driving force with less, or without, increasing the driving voltage applied to the lens driver, compared to the other example equal gaps arrangement. The coil 202*bx*2 of the lens driver may be formed in or on the substrate 202*bx*1 to realize the thin lens driver.

In a similar configuration as the first lens driver 202*bx*, where gaps d1 and d2, and thicknesses w1 and w2, are in the second direction DR2, and coil 202*bx*2, sensing portion 202*bx*3, the first and second magnets 202*bx*4 and 202*bx*5, and first and second yokes 202*bx*6 and 202*bx*7 are respectively disposed with respect to the substrate 20*bx*1 in the second direction DR2, and where the first and second magnets 202*bx*4 and 202*bx*5 are respectively separately disposed with respect to each other in the first direction DR1, the second lens driver 202*by* may include a coil 202*by*2, a sensing portion 202*by*3, first and second magnets 202*by*4 and 202*by*5, and first and second yokes 202*bx*6 and 202*bx*7 respectively disposed with respect to a substrate 202*by*1 in the first direction DR1, where the first and second magnets 202*by*4 and 202*by*5 are respectively separately disposed with respect to each other in the second direction DR2, along with corresponding gaps d1 and d2, and thicknesses w1 and w2, in the first direction DR1.

The coil 202*by*2 of the second lens driver 202*by* may be a winding coil buried in the substrate 202*by*1. Alternatively, the coil 202*by*2 may be a fine pattern (FP) coil, e.g., disposed in or on the substrate 202*by*1.

The first magnet 202*by*4 and the second magnet 202*by*5 of the second lens driver 202*by* are separated and spaced apart from each other in the second direction DR2, the first magnet 202*by*4 may face the coil 202*by*2 in the first direction DR1, and the second magnet 202*by*5 may face the sensing portion 202*by*3 in the first direction. The second magnet 202*by*5 may face at least a portion of the coil 202*by*2 in the first direction DR1.

The second gap d2 between the substrate 202*by*1 and the second magnet 202*by*5 may be greater in the first direction DR1 than the first gap d1 between the substrate 202*by*1 and the first magnet 202*by*4, and the first thickness w1 of the first magnet 202*by*4 may be greater in the first direction DR1 than the second thickness w2 of the second magnet 202*by*5.

The first yoke 202*by*6 may be disposed or positioned on a surface of the first magnet 202*by*4 facing away from the substrate 202*by*1, the second yoke 202*by*7 may also be disposed or positioned on a surface of the second magnet 202*by*5 facing away from the substrate 202*by*1, and the first yoke 202*by*6 and the second yoke 202*by*7 may respectively support or fix the first magnet 202*by*4 and the second magnet 202*by*5. In an example, the first yoke 202*by*6 is separated from the second yoke 202*by*7 in the second direction DR2. In an example, the first yoke 202*by*6 may be connected to the second yoke 202*by*7 in the second direction DR2.

The sensing portion 202*by*3 may include a sensor such as a Hall sensor, and the sensing portion 202*by*3 may be positioned between the substrate 202*by*1 and the second magnet 202*by*5 in the first direction DR1. The second magnet 202*by*5 may be disposed farther from the substrate 202*by*1 in the first direction DR1 than the first magnet 202*by*4, thereby providing a space in which the sensing portion 202*by*3 is disposed between the substrate 202*by*1 and the second magnet 202*by*5 in the first direction DR1. The gap between the first magnet 202*by*4 and the coil 202*by*2 may be maintained to be the relatively small first gap d1 so the driving force caused by the electromagnetic force between the first magnet 202*by*4 and the coil 202*by*2 may not be reduced compared to the other example equal gaps arrangement, as applied to this example with the substrate 202*by*1.

Thus, the coil 202*by*2 may be formed in or on the substrate 202*by*1, the second magnet 202*by*5 facing the sensing portion 202*by*3 may be formed to be thinner than the first magnet 202*by*4 facing the coil 202*by*2, and the second magnet 202*by*5 is disposed farther from the substrate 202*by*1 than the first magnet 202*by*4 so the sensing portion 202*by*3 may be disposed between the substrate 202*by*1 and the second magnet 202*by*5. With such an arrangement according to one or more embodiments, a reduction of the electromagnetic force between the first magnet 202*by*4 and the substrate 202*by*1 may be lessened or prevented to maintain a lens driving force with lessened, or without, increasing the driving voltage applied to the lens driver compared to the other example equal gaps arrangement. The coil 202*by*2 of the lens driver may be formed in or on the substrate 202*by*1 to realize the thin lens driver.

Based on the sensing portion 202*bx*3, the second magnet 202*bx*5, and the coil 202*bx*2 of the first lens driver 202*bx* disposed in parallel to the first direction DR1 of the lens driver 202*b*, a position change of the lens barrel according to the direction that is parallel to the first direction DR1 may be sensed, and based on the sensing portion 202*by*3, the second magnet 202*by*5, and the coil 202*by*2 of the second lens driver 202*by* disposed in parallel to the second direction DR2 of the lens driver 202*b*, the position change of the lens barrel according to the direction that is parallel to the second direction DR2 may be sensed. According to the position sensing results, the coil 202*bx*2 and the first magnet 202*bx*4 of the first lens driver 202*bx* may be activated, e.g., by adjusting a driving voltage applied to the coil 202*bx*2, to move the lens barrel in a direction that is parallel to the first direction DR1, and the coil 202*by*2 and the first magnet 202*by*4 of the second lens driver 202*by* may be activated, e.g., by adjusting a driving voltage applied to the coil 202by2, to move the lens barrel in a direction that is parallel to the second direction DR2.

Figure 6:
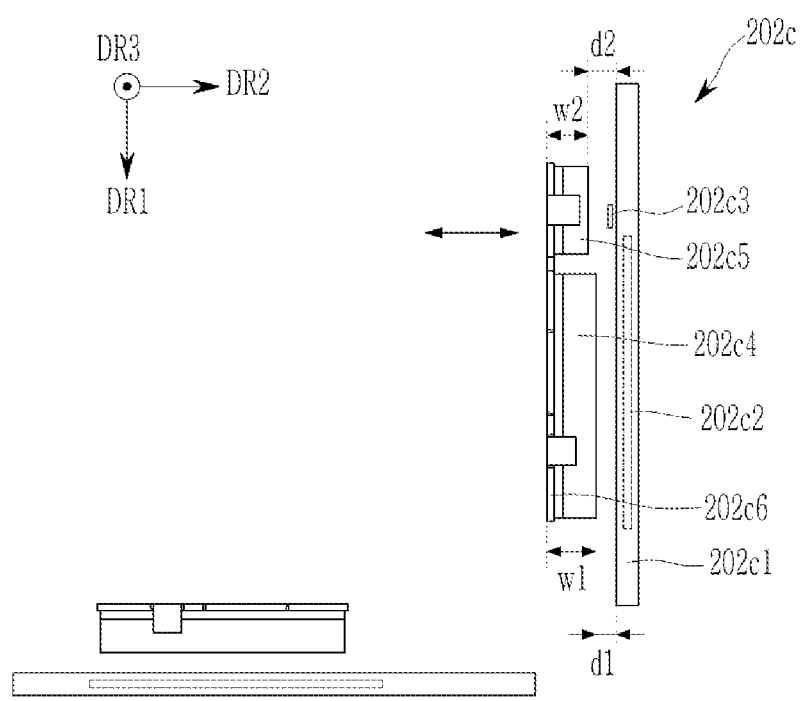
FIG. 6 shows a top plan view of a lens driver according to another embodiment.

FIG. 6 shows a top plan view of a lens driver according to one or more embodiments.

Referring to FIG. 6, the lens driver 202c may be disposed in parallel to the first direction DR1, and may include a substrate 202c1, a coil 202c2, a sensing portion 202c3, a first magnet 202c4, a second magnet 202c5, and a yoke 202c6. The lens driver 202c may correspond to the stabilization driver described above with respect to FIG. 1, as a non-limiting example.

The coil 202c2 of the lens driver 202c may be formed in or on the substrate 202c1, and for example, the coil 202c2 may be a winding coil buried in the substrate 202c1. Alternatively, the coil 202c2 may be a fine pattern (FP) coil.

The sensing portion 202c3 may include a sensor such as a Hall sensor, may be positioned outside the substrate 202c1, may not overlap the coil 202c2 in the first direction DR1 and the third direction DR3 in which the substrate 202c1 extends, and may not overlap the coil 202c2 in the second direction DR2 that is perpendicular to the first direction DR1 and the third direction DR3.

The first magnet 202c4 is separated and spaced apart from the second magnet 202c5 in the first direction DR1. The first magnet 202c4 may face the coil 202c2 in the second direction DR2, and the second magnet 202c5 may face the sensing portion 202c3 in the second direction DR2. The second magnet 202c5 may face at least a portion of the coil 202c2 in the second direction DR2.

A second gap d2 between the substrate 202c1 and the second magnet 202c5 may be greater in the second direction DR2 than a first gap d1 between the substrate 202c1 and the first magnet 202c4 in the second direction DR2.

A first thickness w1 of the first magnet 202c4 may be greater in the second direction DR2 than a second thickness w2 of the second magnet 202c5. In an embodiment, the first thickness w1 of the first magnet 202c4 may be equal, e.g., herein, same or substantially equal, to the second thickness w2 of the second magnet 202c5 in the second direction DR2. In such an example, where the first thickness w1 is equal to the second thickness w2, a surface of the second magnet 202c5 facing the substrate 202c1 may be disposed further from the surface of the substrate 202c1 in the second direction DR2 than a surface of the first magnet 202c4 facing the substrate 202c1, and a surface of the second magnet 202c5 facing away from the substrate 202c1 may protrude by a gap in the second direction DR2 compared to a surface of the first magnet 202c4 facing away from the substrate 202c1. Such examples where the first and second thicknesses w1 and w2 are different and where the first and second thicknesses w1 and w2 are equal, result in the surface of the first magnet 202c4 facing the substrate 202c1 and the surface of the second magnet 202c5 facing the substrate 202c1 not being disposed in series but disposed to have a step in the first direction DR1.

The yoke 202c6 may be disposed or positioned on the surface of the first magnet 202c4 facing away from the substrate 202c1 and on the surface of the second magnet 202c5, and may respectively support or fix the first magnet 202c4 and the second magnet 202c5.

The yoke 202c6 may be planar in the first direction DR1. Rather, in an example, a portion of the yoke 202c6 that corresponds to the second magnet 202c5 may protrude in parallel to the second direction DR2 further from the substrate 202c1 than a portion of the yoke 202c6 that corresponds to the first magnet 202c4. There may be a gap difference in the second direction DR2 between the portion of the yoke 202c6 that corresponds to the first magnet 202c4 and the portion of the yoke 202c6 that corresponds to the second magnet 202c5.

The sensing portion 202c3 may be positioned between the substrate 202c1 and the second magnet 202c5 in the second direction DR2. The surface of the second magnet 202c5 facing the substrate 202c1 is disposed farther from the substrate 202c1 than the surface the first magnet 202c4 facing the substrate 202c1 so a space is provided for the sensing portion 202c3 disposed between the substrate 202c1 and the second magnet 202c5. The gap between the first magnet 202c4 and the coil 202c2 may be maintained to be the relatively small first gap d1, so a reduction of the electromagnetic force between the first magnet 202c4 and the coil 202c2 may be prevented, and the lens driving force may be maintained without having to increase the driving voltage applied to the lens driver. The coil of the lens driver may be formed in or on the substrate to thus realize the thin lens driver.

Based on sensing portion 202c3, the second magnet 202c5, and the coil 202c2 of the lens driver 202c disposed in parallel to the first direction DR1 the position change of the lens barrel according to the direction that is parallel to the first direction DR1 may be sensed, simultaneously with a sensing of the position change of the lens barrel according to the direction that is parallel to the second direction DR2. For example, the sensing portion 202c3, the second magnet 202c5, and the coil 202c2 may sense the gap change according to the direction that is parallel to the second direction DR2 in addition to the horizontal (or vertical) movement according to the direction that is parallel to the first direction DR1. Through this, one lens driver 202c may sense the position change of the lens barrel according to the direction that is parallel to the first direction DR1 and the position change of the lens barrel according to the direction that is parallel to the second direction DR2.

Thus, the coil 202c2 may be formed in or on the substrate 202c1, the second magnet 202c5 facing the sensing portion 202c3 may be disposed farther from the substrate 202c1 than the first magnet 202c4 to realize the thin lens driver, the sensing portion 202bx3 may be disposed between the substrate 202c1 and the second magnet 202c5, and a reduction of the electromagnetic force between the first magnet 202c4 and the substrate 202c1 may be lessened or prevented to thus drive the lens and perform a sensing operation without increasing the driving voltage applied to the lens driver.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An apparatus comprising:
a camera module actuator comprising:
a first coil disposed on a first substrate in a first direction;
a first sensor;
a first magnet facing the first coil in a second direction;
a second magnet facing the first substrate and the first sensor in the second direction;
a third magnet facing a second coil in the first direction, wherein the second coil is disposed on a second substrate in the second direction; and
a fourth magnet facing a second sensor in the first direction,
wherein the first sensor is disposed without overlapping the first coil in the second direction,
wherein the first magnet and the second magnet are separated from each other,
wherein the third magnet and the fourth magnet are separated from each other,
wherein a second gap between the first substrate and the second magnet is different in the second direction than a first gap between the first substrate and the first magnet in the second direction, and
wherein a fourth gap between the second substrate and the fourth magnet is different than a third gap between the second substrate and the third magnet in the first direction.

2. The apparatus of claim 1, wherein the camera module actuator further comprises:
a yoke disposed on respective surfaces of the first and second magnets that are facing away from the first substrate; or
a first yoke is disposed on the surface of the first magnet that faces away from the first substrate and a second yoke is disposed on the surface of the second magnet that faces away from the first substrate.

3. The apparatus of claim 1, wherein the first coil is a fine pattern (FP) coil,
wherein the first and second substrates are separate substrates or different portions of a same substrate.

4. The apparatus of claim 3, wherein the camera module actuator further comprises:
a second sensor disposed without overlapping the second coil on the second substrate in the first direction,
wherein the second gap between the first substrate and the second magnet is greater in the second direction than the first gap between the first substrate and the first magnet in the second direction, and
wherein the fourth gap between the second substrate and the fourth magnet is greater than the third gap between the second substrate and the third magnet in the first direction.

5. The apparatus of claim 3, further comprising:
a lens barrel;
a lens focus driver configured to move the lens barrel in an optical-axis direction perpendicular to the first and second directions;
a housing;
an image sensor; and
a controller configured to perform stabilization, using the first sensor, of the lens barrel in the first and second directions through respective driving of the first and second coils.

6. The apparatus of claim 1, wherein the first sensor is disposed between the first substrate and the second magnet.

7. The apparatus of claim 6, wherein a thickness of the first magnet is equal in the second direction to a thickness of the second magnet in the second direction.

8. The apparatus of claim 7, wherein the camera module actuator further comprises a yoke disposed on respective surfaces of the first and second magnets that face away from the first substrate, and
wherein the yoke protrudes further away from the first substrate where the yoke overlaps the second magnet in the second direction compared to where the yoke overlaps the first magnet in the second direction.

9. The apparatus of claim 8, wherein the camera module actuator further comprises:
a second sensor;
wherein the second sensor is disposed without overlapping the second coil in the first direction,
wherein the second gap between the first substrate and the second magnet is greater in the second direction than the first gap between the first substrate and the first magnet in the second direction, and
wherein the fourth gap between the second substrate and the fourth magnet is greater than the third gap between the second substrate and the third magnet in the first direction.

10. The apparatus of claim 9, wherein the second sensor is disposed between the second substrate and the fourth magnet.

11. The apparatus of claim 10, wherein a thickness of the third magnet is equal in the first direction to a thickness of the fourth magnet in the first direction.

12. The apparatus of claim 11, wherein the camera module actuator further comprises another yoke disposed on respective surfaces of the third and fourth magnets that face away from the second substrate, and
wherein the other yoke protrudes further away from the second substrate where the other yoke overlaps the fourth magnet in the first direction compared to where the other yoke overlaps the third magnet in the first direction.

13. The apparatus of claim 6, wherein a thickness of the first magnet in the second direction is unequal to a thickness of the second magnet in the second direction.

14. The apparatus of claim 13, wherein the first magnet is thicker in the second direction than the second magnet in the second direction.

15. The apparatus of claim 14, wherein the camera module actuator further comprises a yoke disposed on respective surfaces of the first and second magnets that face away from the first substrate, and
wherein a surface of the yoke facing away from the first substrate is planar in the first direction.

16. The apparatus of claim 15, wherein the camera module actuator further comprises:
a second coil disposed on a second substrate in the second direction;
a second sensor;
a third magnet facing the second coil in the first direction; and
a fourth magnet facing the second substrate and the second sensor in the first direction,
wherein the second sensor is disposed without overlapping the second coil in the first direction,
wherein the second gap between the first substrate and the second magnet is greater in the second direction than the first gap between the first substrate and the first magnet in the second direction, and wherein the fourth gap between the second substrate and the fourth magnet is greater than the third gap between the second substrate and the third magnet in the first direction.

17. The apparatus of claim 16, wherein the second sensor is disposed between the second substrate and the fourth magnet.

18. The apparatus of claim 17, wherein a thickness of the third magnet in the first direction is unequal to a thickness of the fourth magnet in the first direction.

19. The apparatus of claim 18, wherein the third magnet is thicker in the first direction than the fourth magnet in the first direction.

20. The apparatus of claim 19, wherein the camera module actuator further comprises another yoke disposed on respective surfaces of the third magnet and the fourth magnet that face away from the second substrate,
wherein a surface of the other yoke facing away from the second substrate is planar in the second direction.

21. An apparatus comprising:
a camera module actuator comprising:
a fine pattern (FP) coil disposed on a substrate in a first direction perpendicular to an optical axis of a lens barrel;
another coil disposed on the substrate in a second direction perpendicular to the first direction and the optical axis;
a Hall sensor;
a driving magnet facing the FP coil in the second direction; and
a sensing magnet, separated from the driving magnet in the first direction, facing the hall sensor and a first portion of the substrate in the second direction, the first portion of the substrate being a portion of the substrate where the FP coil is not disposed,
wherein the sensing magnet partially overlaps the FP coil in the second direction.

22. The apparatus of claim 21, wherein a second gap between the first substrate and the sensing magnet is greater in the second direction than a first gap between the first substrate and the driving magnet in the second direction.

23. The apparatus of claim 21, wherein the driving magnet is thicker in the second direction than the sensing magnet in the second direction.

24. The apparatus of claim 21, further comprising a controller configured to perform selective stabilization, using the hall sensor, of the lens barrel in the first and second directions respectively through a driving of the FP coil and the driving magnet and a driving of the other coil and a corresponding driving magnet.

* * * * *